(12) United States Patent
Hughes

(10) Patent No.: US 11,255,100 B1
(45) Date of Patent: Feb. 22, 2022

(54) PERMANENT BELOW GROUND FLOOD BARRIER INSTALLATION

(71) Applicant: Christopher T. Hughes, Hawley, PA (US)

(72) Inventor: Christopher T. Hughes, Hawley, PA (US)

( * ) Notice: Subject to any disclaimer, the term of this patent is extended or adjusted under 35 U.S.C. 154(b) by 0 days.

(21) Appl. No.: 17/300,558

(22) Filed: Aug. 17, 2021

Related U.S. Application Data

(60) Provisional application No. 63/103,707, filed on Aug. 21, 2020.

(51) Int. Cl.
*E04H 9/14* (2006.01)
*E02B 3/10* (2006.01)

(52) U.S. Cl.
CPC ............. *E04H 9/145* (2013.01); *E02B 3/102* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,458,456 A | * | 7/1984 | Battle | E04H 9/145 52/63 |
| 5,154,537 A | * | 10/1992 | DeVries | E02B 3/02 405/211 |
| 6,029,405 A | * | 2/2000 | Wood | E04H 3/14 52/2.23 |
| 6,216,399 B1 | * | 4/2001 | Belarbi | E04H 9/14 52/169.14 |
| 7,972,081 B2 | * | 7/2011 | Linares | E02B 3/104 405/105 |
| 2004/0098937 A1 | * | 5/2004 | Blake | E04H 9/145 52/302.6 |
| 2013/0302092 A1 | * | 11/2013 | Ortiz | E02B 7/005 405/36 |
| 2016/0083918 A1 | * | 3/2016 | Cadogan | E06B 9/0692 405/115 |

* cited by examiner

*Primary Examiner* — Kyle Armstrong
(74) *Attorney, Agent, or Firm* — Sandra M. Kotin

(57) ABSTRACT

A permanent below-ground flood barrier installation is characterized by a trench surrounding a specified area. A concrete ballast lines the trench and anchors a covered housing containing a flexible water impermeable fabric wall and a series of supports. When a flood is impending the housing is opened, the supports removed and set up vertically at ground level, and the fabric wall extended upward. The fabric wall is attached at its upper edge to the cover set atop the supports, and at its lower edge to the housing. Three point anchoring of the supports maintain them in vertical orientation and stop means prevent backward movement during storm surges. When flooding subsides the components can be cleaned, dried and returned to the housing. No tools or special skills are required to set up the wall and supports once the initial installation has been completed.

31 Claims, 7 Drawing Sheets

PERMANENT BELOW GROUND FLOOD BARRIER INSTALLATION

This application contains the same material disclosed in a Provisional Patent application Ser. No. 63/103,707 filed on Aug. 21, 2020. The information regarding the Provisional Patent is contained in the Application Data Sheet submitted herewith.

FIELD OF THE INVENTION

The instant invention relates to a permanent below-ground installation in the form of a continuous trench of substantial depth with a concrete ballast extending the full length and width of the trench, to surround an area to be protected and to provide a secure anchor for a housing containing a flexible flood barrier wall and wall supports that can be erected quickly by unskilled persons to function as a levee or retaining wall to protect against rising waters during flood conditions. The housing and flexible wall can be made in connectable water impermeable units of any desired length and contour to conform to the line of the installation. After the flood waters have receded the barrier wall and supports can be cleaned and replaced into the housing to be reused as needed.

BACKGROUND OF THE INVENTION

Flooding caused by rising waters has been a problem for mankind since the beginning of recorded time. Though certain areas have repeatedly been subject to such occurrences there are now parts of the country and of the world that have been effected in more recent years for the first time. Existing levees may no longer be sufficient to protect property and buildings and sandbags require considerable time and transport of materials and may also be insufficient protection. Recent floods have included strong storm surges and high waters in areas not effected in the past or unlike those previously experienced. Such floods have become a very real problem that must be addressed in order to protect homes, businesses, and other properties. During Hurricane Sandy in 2012 New York City experienced damage from salt water that had never before been a problem. The city utilized mobile inflated barriers that had to be brought to the low lying areas and inflated and then afterward had to be removed, cleaned and stored. Each step requiring much time and manpower. Inventors have considered a variety of permanent installations that can be set up with minimal time and effort when a flood threat is imminent.

Another consideration that must be addressed is the increasing government requirements for reuse and treatment of materials exposed to flood waters. FEMA has recognized the hazardous nature of such exposed materials and has noted that soils, sediments and sandbags that are suspected to be contaminated should be tested and screened to remove the contaminants and other debris and must be disposed of under stringent regulations. Contamination may include sewage, bacteria, heavy metals, fuel oil, industrial chemicals, agricultural chemicals and pesticides, all of which can be found in most populated areas. Additionally, States have developed specific requirements for managing contaminated soils, sediments and sandbags. Sand used to hold back flood waters can no longer be returned to beaches and playgrounds. New solutions for flood control can no longer be in contemplation, they are an absolute necessity.

Thompson, in U.S. Pat. No. 4,488,386, devised a rolled flexible waterproof shield that is attached to the foundation footings of a building, extends along the foundation, and is adhered to the foundation with a waterproof adhesive. The shield is attached to a roll bar and stored in a storage box that surrounds the foundation and lies just below ground level. The storage box is covered with a hinged cover. When needed the cover is lifted and the shield is extended upward by grasping the roll bar which is thereafter supported on hooks inserted into the sides of the building at a desired height above ground level. The shield completely covers the building up to the height of the hooks and can be re-rolled and placed back in the storage box when no longer needed. This system must be installed when the building is constructed and is only practical for buildings of limited circumference. Only the building is protected, not any surrounding land.

In U.S. Pat. No. 5,988,946, Reed discloses an inflatable flood barrier that is stored in a trough that surrounds the area to be protected and is closed by a cover plate. The trough is surfaced with a layer of concrete. The barrier itself is a series of inflatable interconnected bladders in vertical alignment to a common connecting surface. The lower end of the common connecting surface is anchored to the bottom of the trough with an anchoring plate. When needed, the cover plate is removed and the bladders inflated using a source of compressed air. All bladders are essentially one unit and are inflated together. The inflated bladders face away from the flood waters and the common connecting surface faces the flood waters. The pressure of the flood waters compresses the bladders downward to form the flood barrier. A second embodiment has each bladder with its own filling valve, no trough, and a concrete block that is partially below ground level to which the common connecting surface is attached with a bolt through an anchoring plate that is secured to the concrete block. This embodiment is not stored on site except that the concrete block is set in place in the area where flooding is expected. These embodiments are dependent upon the strength of the material of which the bladder assembly is composed and its ability to resist tearing free of the anchoring plate under increasing pressure due to the flood waters.

A somewhat different concept was provided by Belarbi in U.S. Pat. No. 6,216,399. This system was designed to protect a building and uses a series of boxes interconnected to completely surround the building. The covered boxes are placed at least partially below ground level and remain in place when the system is utilized. A protective cloth is folded into the boxes with a float attached to the upper end of the cloth. The lower end of the cloth is attached to a bottom plate or L-shaped pivotable brackets. When flood conditions are impending, the covers are removed and as the water reaches the boxes the float rises with the rising water and the cloth is extended upward carried by the float. As the water continues to rise the cloth is moved towards the building and the cloth is lifted up along the face of the building. Sensors can be placed into the system so that when water is approaching the cover is lifted automatically. Brackets can be installed along the outside of the boxes to prevent them from being lifted upward by the lifting forces of the float. A similar approach was taken by Vecherin et al. in U.S. Pat. No. 8,500,365. disclosing a compartment permanently installed in the ground with drainage openings so that ground water can enter the compartment. A collapsible frame is affixed to the bottom of the compartment. The top of the frame is attached to a floating bar comprised of any material lighter than water that will float. The protected side of the frame is covered with a water impermeable sheet and a permeable cloth or netting is affixed on the flood side to prevent debris from contacting the frame and sheet. As the water enters the compartment the float rises and with it the cloth covered frame which prevents the waters from passing beyond this "dam". As the water recedes the float moves downward until the frame is once again collapsed within the compartment. This system is designed to operate with no human intervention. No specific materials are mentioned from which to construct the frame, however, it was noted that different driving systems such as hydraulic or electric can be used as assists to unfold the frame. There is no indication as to whether the use of the assists would be automatic or would have to be initiated by a person. Neither of these inventions would be practical with waters exhibiting any significant force or height.

In U.S. Pat. No. 9,453,314, Cadogan et al. discloses a flood barrier assembly to surround a specific area in the form of a permanent installation stored beneath ground level in a trench having a protective cover. Within the trench are stored a folded membrane wall, posts to support the wall, and a base plate or mounting plate which lies along the bottom of the trench to which are attached post receivers into which the posts are set to assist in supporting the membrane wall. The trench is lined with a gasket seal. The posts are stored in a compartment within the trench and the membrane wall is folded into the trench with its bottom edge terminating under a clamping bar and seal located on the mounting plate. When needed, the cover is removed and the posts set into the post receivers. The membrane wall is extended and attached to the posts by means of tethers on the membrane wall and anchors on the posts. It is noted that a deployable buttress can be added to the posts to further support the wall but no specific description of the buttress or attachment means is provided. The patent states that the mounting plate may or may not be physically connected to the trench. A review of the illustrations shows that only a small portion of each post is supported within a receiver. Therefore, any strong force or storm surge could easily topple or uproot the posts or uproot the entire mounting plate. In U.S. Pat. No. 7,121,764, Rorheim discloses a portable flood barrier system designed to protect areas from flooding due to melted snow, storms or heavy rain. This system consists of a series of foldable structures that can be set to adjoin one another to form an extended barrier. Each structure is made up of two flat panels hinged together and further connected by means of a flexible tie. When set for use, one panel lies on the ground and the other is extended to a vertical orientation such that the common surfaces of the adjoined structure face the oncoming water. The flexible ties prevent the vertical panels from being pushed beyond their vertical orientation by the force of the water. Sealing means are provided so the water cannot get under the structures. This system must be anchored to the ground and provisions are made for a concrete foundation which must be built prior to the flooding in areas where flooding is expected. Various embodiments of the foldable structures are described, each with a different means to affix each structure to the concrete foundation. This system is not designed for high water or storm surges.

Though each of the prior art disclosures exhibits interesting concepts and advantages, none will sustain the onslaught of the high waters and strong water surges now becoming more frequent in the changing world of which we are all a part. Many advantages of permanent installations were shown by the prior art, but looking at features from each, none exhibit the means to withstand a storm surge of any major impact. The only disclosure that provides a real anchor is for a portable panel system that is only designed for flooding due to melting snow and heavy rain. The systems with floatable barriers are only good if a flood stems from a rising lake during a spring thaw and neither has any real ground anchor. Most of the barriers discussed above have flex and mobility but lack sufficient support or ground anchor to withstand any significant forces.

Flood mitigation is best achieved when the solution is readily at hand. Time is precious from warning to ready protection. Flash flooding is becoming more frequent so that any system that requires transporting materials to a site and then erecting barriers greatly reduces that short window of time needed to hold back a moving force of tons of water. Often by the time a flood warning is sent out the weather may already be bad slowing transportation and impacting outdoor working conditions. A system that is on site, in the ground, always ready for deployment by as few as two people, and requires no tools, is as necessary today as a levee of sandbags may have been two hundred, or even one hundred years ago.

There is a need for a permanent flood barrier that is hidden from view but easy to access and deploy as needed. There is a need for such a barrier that can be manufactured in modules to be connected together in a water impermeable manner and installed to surround areas of various shapes, sizes and terrains. There is a need for a barrier that is securely anchored so that it will withstand storm surges of considerable force and duration and so that the barrier cannot be pulled from its foundation or forced backward by an oncoming wall of water. There is also a need for a system that can be set up quickly by a minimum of unskilled personnel with little forewarning and thereafter cleaned and replaced into its containment means to be reused as needed.

BRIEF SUMMARY OF THE INVENTION

The instant invention provides a permanent installation that may be hidden from view below ground level. A trench may be dug into the ground around the area to be protected. A concrete foundation or permanent ballast may be poured into the bottom of the full length and width of the trench to provide secure stability and weight to the flood barrier. Interconnected modules in the form of an elongated housing may be anchored into the trench by bolts secured into the concrete ballast. The housing may contain the components of the flood barrier, i.e., a water impermeable membrane wall the lower end of which may be affixed to the housing and a series of foldable support structures to maintain the membrane wall. The interconnected modules may together provide a single water proof container, the housing, around the area to be protected, and sections, or panels, of the water impermeable membrane may likewise be connected together to form the continuous water impermeable membrane wall. When deployed, the foldable support structures may be removed from the housing and anchored at ground level to rest behind the membrane wall. The installation may have a protective cover that can be removed easily to expose the components and may be utilized by being placed atop the anchored supports and have the upper end of the water impermeable membrane wall affixed thereto. Just as the concrete ballast may provide the security anchor for the flood barrier wall, the additional anchors may provide security for the support structures to insure that they withstand the considerable water pressures, high winds, and storm surges that may come. No special skills may be necessary to erect the flood barrier wall once the installation has been completed since all necessary components may be present within the housing to be easily deployed without the need for any tools.

The installation requires an excavation to prepare the long trench that may be defined by the perimeter of the area to be protected. This area and the extent of the excavation may be dependent upon the topology and geology of the area which will determine how the excavation is to proceed. The modules may be manufactured in specific lengths which may include modules having angles and curves so that any shaped area may be protected using the present system.

It is an object of the instant invention to provide a series of connectable and water impermeable modules to be installed into the ground to surround an area to be protected from flood waters.

It is another object of the instant invention to provide modules equipped with a water impermeable membrane and a series of foldable support structures to form a flood barrier that can be erected quickly and replaced into the modules when no longer needed.

It is a further object of the instant invention to install the modules into a trench dug into the ground surrounding the area to be protected and to further have a poured concrete base along the bottom of the full length and width of the trench to create a strong foundation and sufficient ballast to anchor and prevent any displacement of the modules due to the forces of the flood waters or storm surges.

Another object of the instant invention is to provide means to securely affix the modules to the concrete ballast to prevent any uplift or separation of the modules or of the flood barrier when confronted by strong water forces and surges.

A still further object of the instant invention is to provide anchoring means to securely hold the support structures in place at ground level behind the membrane wall so that the membrane wall and supports cannot be distorted or toppled during the onslaught of flood conditions.

An object of the instant invention is to have a means to attach the water impermeable membrane to the cover and the cover secured and supported on top of the support structures to complete the installation of the flood barrier.

An object of the instant invention is also to have fully insulated covers to protect and insulate the interiors of the modules when the barrier wall is not in use.

Another object of the instant invention is to have a flood barrier assembly that is always ready even on very short notice and which can be erected by very few workers with no special skills or tools.

A further object of the instant invention is to provide a flood barrier installation that can be installed and function well in large cities as well as rural and seashore areas and is only dependent upon the accessibility of the area to prepare the trench in which the ballast and the modules are permanently installed.

The invention is a permanent below ground flood barrier installation to protect a specified area when flood waters are imminent that comprises a trench surrounding the area to be protected, the trench having a bottom surface, a concrete ballast disposed along the bottom surface of the full length of the trench, a housing the length of the trench disposed above the concrete ballast and anchored to it, the housing having an interior, a flexible water impermeable fabric wall foldably contained within the housing and extendable upward to protect the area when flood waters are imminent, a series of supports contained within the housing, the supports to be set at ground level to maintain the fabric wall when extended upward and the supports are substantially in the shape of a right triangle with a longer leg being windwardly and vertically oriented when the supports are set at ground level, and a shorter leg being the base of the support in contact with the ground and the hypotenuse oriented leewardly, the support s being composed of two segments which together form the right triangle with the bases of the two segments being coextensive, of equal length, and together forming the base, the segments being hingedly connected together such that when folded and placed longitudinally within the housing they do not extend beyond an interior of the housing, and a removable cover to protect the interior of the housing and its contents when not in use against flood waters and to form an integral part of the flood barrier.

The present invention is also a permanent below ground flood barrier installation to protect a specified area when flood waters are imminent which comprises a trench surrounding the area to be protected, the trench having a bottom surface, a concrete ballast disposed along the bottom surface of the full length of the trench, a housing the length of the trench disposed above the concrete ballast and anchored to it, the housing having an interior, means for anchoring the housing to the ballast so that the housing is not contiguous with it, a flexible water impermeable fabric wall foldably contained within the housing and extendable upward to protect the area when flood waters are imminent, the fabric wall having an upper edge and a lower edge, a series of supports having a horizontal upper edge contained within the housing, the supports to be set at ground level to maintain the fabric wall when extended upward, and a removable cover to protect the interior of the housing and its contents when not in use against flood waters and to form an integral part of the flood barrier. There are also means for affixing the lower edge of the fabric wall to the housing so that the flood waters cannot enter the housing or pass beyond the fabric wall and means for affixing the upper edge of the fabric wall to the cover so that the cover can be set on the horizontal upper edges of the supports to sustain the upward extended fabric wall, whereby the fabric wall is secured at the lower edge to the housing and the upper edge to the supported cover to form the completed flood barrier and the flood waters cannot pass therebeyond.

The present invention is further a permanent below ground flood barrier installation for rapid deployment, requiring no special skills or implements, for the protection of a specified area when flood waters are imminent. The installation comprises a trench surrounding the area to be protected, the trench having a bottom surface, a concrete ballast disposed along the bottom surface of the full length of the trench, a housing the length of the trench disposed above the concrete ballast and anchored to it, the housing having an interior including two sidewalls, a windward wall and a leeward wall, with an inward facing flange along the full-length of an upper edge of both sidewalls, a series of spaced apart openings along the full length of the inward facing flange on the upper edge of the windward wall and the housing formed of a series of interconnected modules, means for anchoring the housing to the ballast, and a flexible water impermeable fabric wall foldably contained within the housing and extendable upward to protect the area when flood waters are imminent, the fabric wall formed from a series of reversibly connected panels and having an upper edge and a lower edge, each panel being contained within one module. There are also a series of supports having a horizontal upper edge and contained within the housing, the supports to be set at ground level to maintain the fabric wall when extended upward, a removable cover to protect the interior of the housing and its contents when not in use against flood waters and to form an integral part of the flood barrier, the cover comprising a series of interconnected segments, one segment for each module, means for affixing the lower edge of the fabric wall to the housing so that the flood waters cannot enter the housing or pass beyond the fabric wall, and means for affixing the upper edge of the fabric wall to the cover so that the cover can be set on the horizontal upper edges of the supports to sustain the upward extended fabric wall, whereby the fabric wall is secured at the lower edge to the housing and the upper edge to the supported cover to form the completed flood barrier and the flood waters cannot pass therebeyond.

Further features and advantages of the present invention will be seen from the following description and drawings.

DETAILED DESCRIPTION OF THE INVENTION

Figure 1:
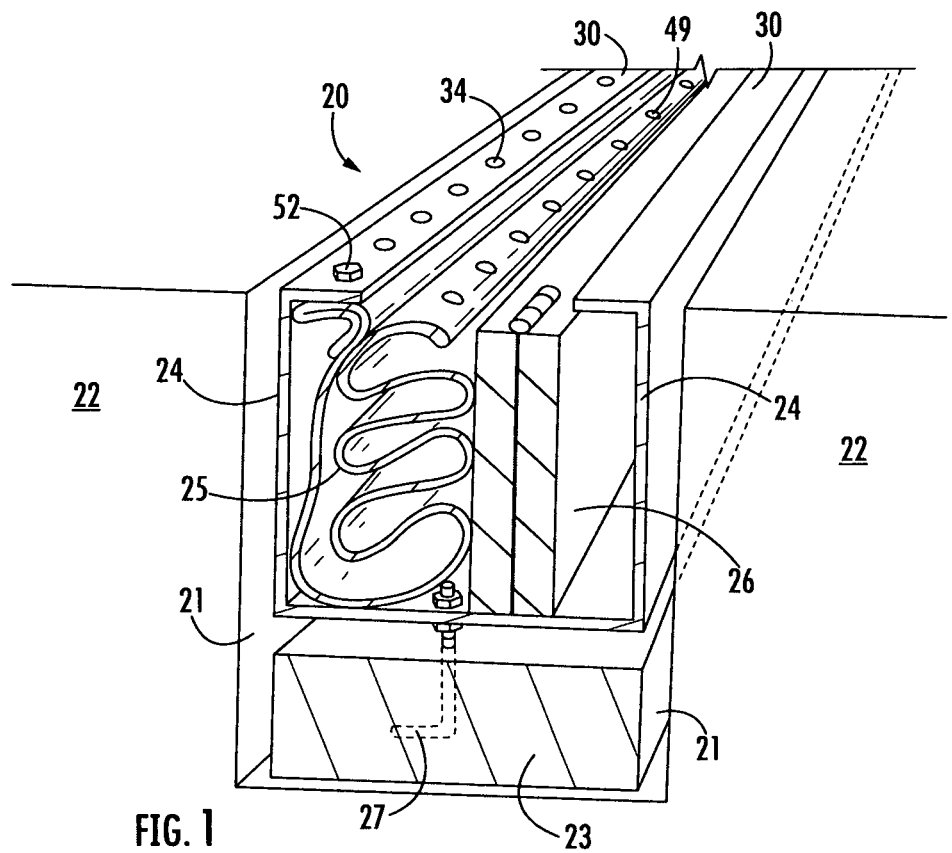
FIG. 1 is a side perspective view of a section of the flood barrier assembly of the instant invention with stored fabric panel and support.

The flood barrier assembly 20 provided by the instant invention consists of six basic components, a trench 21 dug into the ground 22 to surround the area to be protected, a poured concrete ballast 23 running the full length of the trench 21, a housing 24 disposed within the trench 21 above the ballast 23 and connected thereto, a flexible and water impermeable membrane wall 25, foldable supports 26 to shore up the membrane wall 25, the latter two components to be stored within the housing 24, and a cover 36 for the housing 24. This may seem an oversimplification, but may clearly indicate that once in place, these few components may offer the necessary protection to property in the face of severe weather. All components except the cover 36 may be seen in FIG. 1.

The flood barrier installation first requires a site-plan carefully constructed after a thorough topographical survey of the property or access to FEMA maps showing the infra structure of the land to be protected as well as the surrounding area. Just as in the building of a house or other large structure, the location of the trench 21 may require considerable planning and surveys. Once the line of the trench is established, a construction company with the proper heavy equipment may prepare the trench 21. The trench 21 may completely surround an area or may only cover a select stretch of ground. This may be dependent upon the topography as to the elevation in and around the area as well as the direction from which the possible flooding may originate.

The depth of the trench 21 may be determined before any ground preparation takes place and may be dependent upon the estimated flood conditions expected to effect the area under consideration. This estimate may be most critical since the measurements and proportions of each component may be site dependent and site customized. The predicted height of flood waters may determine the height of the membrane wall 25 needed to hold the waters back and therefrom the height of the foldable supports 26 to back up the membrane wall. The foldable supports 26 may be folded in half lengthwise and stored within the housing 24 along with the membrane wall 25. Therefore, the housing 24, must be sufficiently deep to completely contain the folded supports 26 and accordingly, the width of the supports may be the main criteria in calculating the depth of the housing 24 and therefrom the depth of the trench 21. The knowledge of expected storm surges and flood depths must be known before any dimensions for the entire system may be determined. The height of the membrane wall 25 may also determine the dimensions of the ballast 23 disposed on the floor of the trench 21. The ballast 23 must be able to prevent any lifting or distortion of the barrier wall in the face of rising waters, storm surges and also the winds which may come from any direction before the flooding occurs.

Once the proper dimensions have been determined, the trench 21 may be dug and the concrete ballast 23 poured along the full length of the trench 21. The depth of the ballast 23 and thereby its overall weight may also depend upon the estimated height of the flood waters. The ballast 23 may be poured in sections using frames, much like the preparation of footings for a house. The work may progress systematically and each section may have the same dimensions. The use of the frames may also be preferred if the land is not level and the trench 21 follows uneven ground and sloping terrain. As each section of ballast 23 begins to set, anchor bolts 27 may be inserted into the concrete at discrete intervals. An anchor bolt 27 may be seen in FIG. 1. The anchor bolts 27 may be threaded at their upper ends which may protrude from the surface of the concrete ballast 23 and may be used for the attachment of the housing 24 to the ballast 23

The housing 24, membrane wall 25, and supports 26 may be factory manufactured to the specifications determined by the requirements of the property to be protected. The housing 24 may be manufactured in segments of specific lengths, optimally 10 feet (3.05 m). Additional units may be prepared to account for angles and curves according to the requirements of each project. The housing components may be connected to each other using water impermeable gaskets or seals, many of which are well known in the art, or they may be connected using a friction fit or press fit in which case sufficient overlap, typically 6 in. (15.24 cm) may add to the length. This overlap allowance may also be dependent upon the particular site requirements and circumstances of installation. A sealant may be used to insure that no water can permeate the point of joinder.

Figure 2:
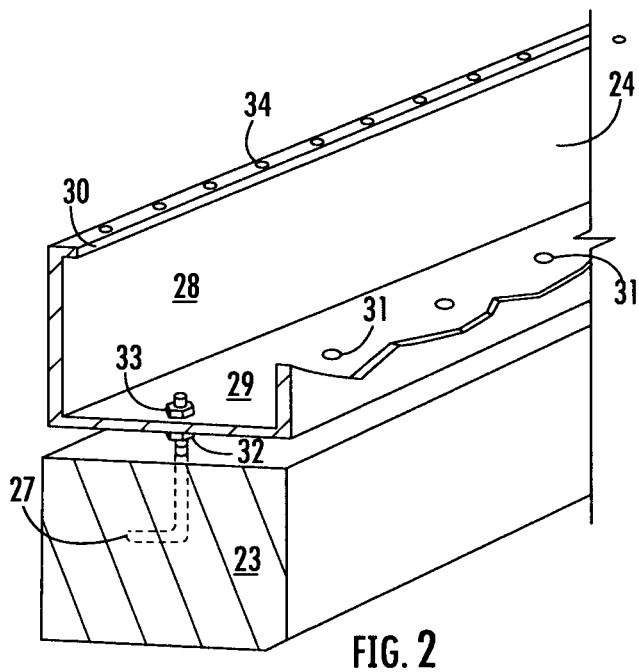
FIG. 2 is a side perspective view of a segment of the housing and ballast, one wall of the housing partially cut away.

The housing 24 may be in the form of a U-shaped trough with substantially vertical sidewalls 28 and a flat bottom surface 29. There may be an inward facing horizontal flange 30 along the top edge of both sidewalls 28 with a series of spaced apart openings 34 along the windward flange 30. A series of openings 31 may be disposed at discrete intervals along the center line of the bottom surface 29 of the housing 24 as seen in FIG. 2. Alternate openings 31 may cooperate with the heads of the anchor bolts 27 imbedded into the concrete ballast 23 to enable the housing 24 to be anchored to the ballast 23. Once the housing 24 is securely anchored to the ballast 23, any potential lifting of the housing 24 and the membrane wall 25 when the system is fully engaged during storm conditions may be completely eliminated. A template corresponding the placement of the alternate openings 31 in the bottom of the housing 24 may be used to properly space the anchor bolts 27 into the concrete when the ballast 23 is poured.

If the housing 24 were to rest on the upper surface of the ballast 23 a problem may arise connecting one section of housing to the next when there is the slightest variance in height between the adjacent sections of ballast and more so when the terrain is uneven. Therefore, the housing 24 may be supported on the anchor bolts 27 while not in direct contact with the ballast 23. This may be accomplished by using two nuts to affix the housing 24 to each of the anchor bolts 27 protruding through the openings 31 along the bottom surface 29 of the housing 24. A lower nut 32 may be threaded onto each anchor bolt 27 before the housing 24 is set in place. Once each anchor bolt 27 in a given section of ballast 23 has received a lower nut 32 and the heights of the lower nuts 32 have been adjusted, the housing 24 for that section can be properly set in place. The setting of the lower nuts 32 may insure that each housing unit is securely supported and may also function as a leveling means between adjacent housing units. All height adjustments may be made at this time. Once the lower nuts 32 have been properly adjusted and the housing 24 set in place with the heads of the anchor bolts 27 protruding through the openings 31 in the bottom of the housing 24, an upper nut 33 may be threaded onto the head of each anchor bolt 27 and tightened to complete the secure installation of the housing 24. (See FIG. 2) Washers may be used with each nut if desired. While providing a secure anchor for the housing 24, the use of the two nuts may also enable adjacent housing sections to be joined together with excellent alignment.

As one housing unit is set in place the lower nuts 32 may be set for the adjoining housing unit. The housing units must not only be set level and secure, but each must be permanently affixed to the adjacent unit in a water impermeable manner. This may be accomplished using sealants and gaskets known in the art.

When the housing 24 units have been secured in place along the full length of the enclosure, the components of the barrier wall may be placed into the housing 24. As noted above, there are two main components, the flexible water impermeable membrane wall 25 and the foldable supports 26.

The flexible water impermeable membrane wall 25 may be composed of a fabric that may be single ply or multi-ply, woven or non-woven. Many such fabrics are known in the art. The full membrane wall 25 may be made up of a series of wall segments or panels 40, one panel 40 may be disposed in each housing unit 24. The panels 40 may be constructed according to the requirements and specifications of each site plan and the effective length of each panel may be substantially the same length as the housing units 24. Therefore, for use in a 10 ft (3.05 m) housing unit 24, the panels 40 may have an effective length of 10 ft (3.05 m). The height of the panels 40 may be substantially 12 in (30.5 cm) greater than the height of the anticipated flood waters. For an anticipated 3 ft (0.91 m) flood height the panels 40 would each be 4 ft (1.23 m) high. Therefore, the effective dimensions of each fabric panel 40 for this example may be 10 ft (3.05 m)×4 ft (1.23 m).

Figure 3:
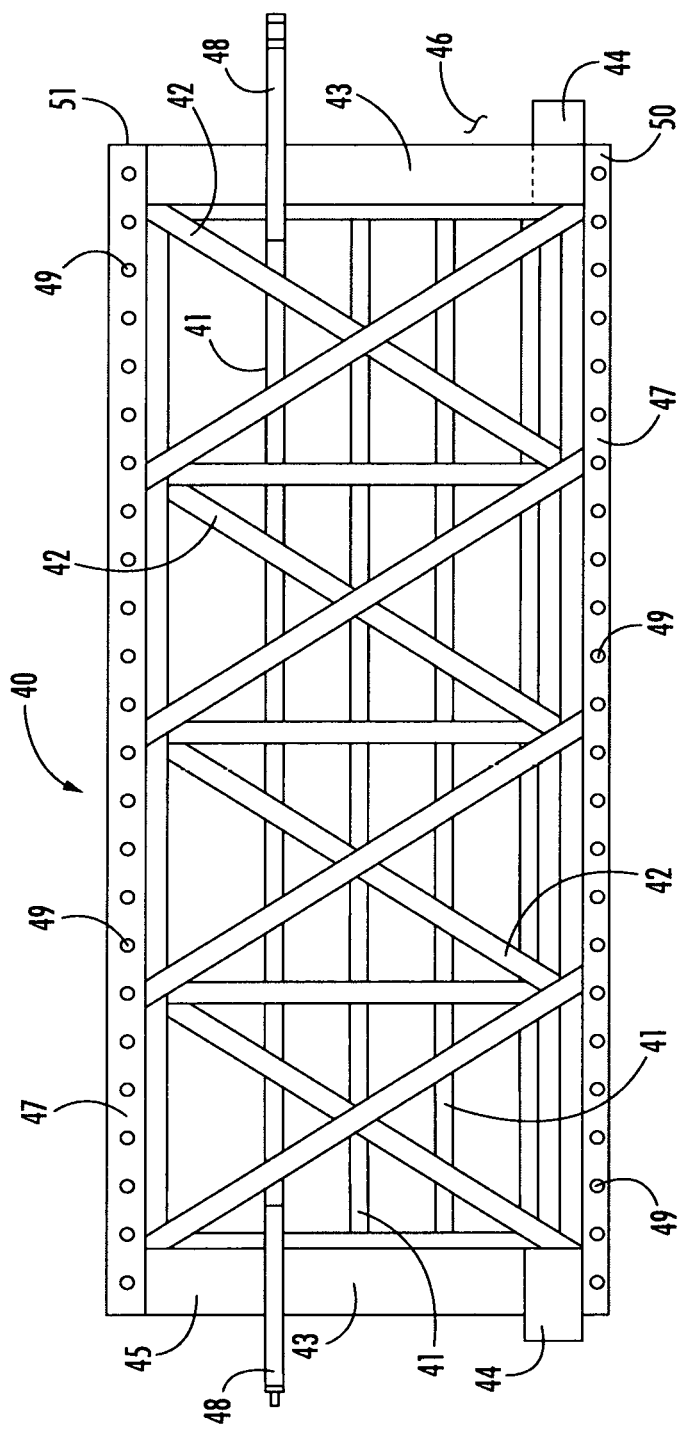
FIG. 3 is a top plan view of a fabric panel.

The fabric panels 40 may be factory manufactured to the specifications of each project. When subjected to oncoming flood waters there may be considerable debris and random materials that may be forced against the barrier wall. Therefore, it may be essential that the panels 40 be sufficiently reinforced to withstand any oncoming forces. There may be a series of reinforcing strips sewed or otherwise fixed onto the fabric. The strips may be vertical, horizontal 41 and diagonal 42 and placed in predetermined intervals along the extent of the panels 40. The horizontal strips 41 may be placed closer together in descending order to account for the greater pressure on the lower portions of the membrane wall 25. There may be a strip 43 of hook and loop fastener along each side edge of the panel 40 to enable the attachment of one panel to the adjacent panel in a secure and water impermeable manner. These strips 43 may be 6 in (15.24 cm) wide, with a hook strip on the obverse face 45 of the panel 40 and a loop strip on the reverse face 46 of the panel 40 and disposed at the opposite side edge, so that each strip 43 may interact with the cooperating strips 43 on the side edges of the adjoining panels to securely join each panel to its neighboring panels. A typical wall panel 40 may be seen in FIG. 3. Zippers or any other such attaching means known in the art may also be used to attach adjoining panels so long as the attachment may be made secure and water impermeable. Any such joinder must be able to resist side shear separation.

The predicted height of the flood waters and therefore the height of the membrane wall 25 may also factor into the width of overlap needed for the hook and loop strips 43 at each side edge of the panels 40 or of the specific strength requirements of other chosen means of joinder.

For an additional reinforcement along the bottom of each side of the panels 40, there may be a tab 44 sewn into both lower corners. One tab 44 may be sewn on the obverse side 45 of the panel 40 and the tab on the opposite corner may be sewn on the reverse side 46. During installation both tabs 44 overlap the adjacent panels and are fixed in place, using an appropriate adhesive, one above the other, so that each lower corner may be further reinforced with two tabs 44. Special clamps or other such attaching means may also be used at the lower corners to provide permanent attachments. These points of additional reinforcement may represent the areas of greatest expected forces and stresses to the system when in use against flood waters. The permanent attachments at the lower corners may also hasten the deployment of the fabric wall.

Depending upon the height of the flood waters expected in the area of installation, there may be additional reinforcing straps 48 sewn into both side edges of each panel 40 at substantially the midpoint of its height. For added security, the straps 48 may be sewn into the fabric along one of the horizontal reinforcing strips 41 and may be sufficiently long so as to be able to be buckled or otherwise connected to the corresponding strap 48 on the adjoining panel 40. These may also be seen in FIG. 3. Metal clips that cross the panel 40 overlap may also serve to reinforce this connection.

During construction, each panel 40 may have an additional length of fabric left along both its upper and lower edges. This additional fabric may be folded over and stitched or otherwise maintained in place to provide reinforced areas 47 along the upper edge 51 and lower edge 50 of each panel 40. A series of grommets 49 may be inserted at regular intervals along both the reinforced areas 47. This may be seen in FIG. 3. These grommets 49 may be the means of attachment of the lower edge 50 of the panel 40 to the housing 24 and the upper edge 51 of the panel 40 to the cover 36.

Figure 4:
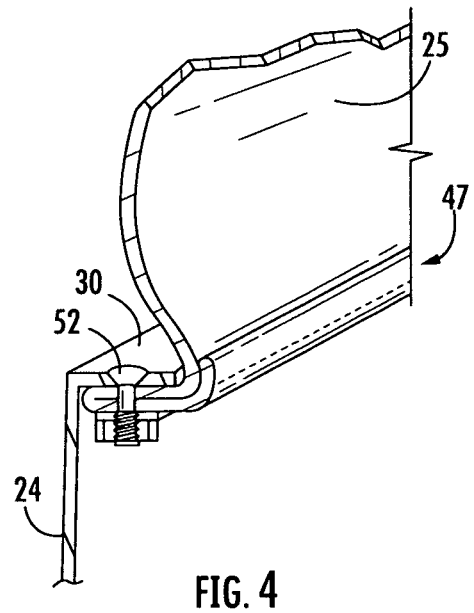
FIG. 4 is a perspective view of the attachment of a fabric panel to the flange on the windward wall of the housing.

Once the housing units 24 are all in place the fabric panels 40 may be installed. This may be a permanent installation and may be accomplished in one housing unit 24 at a time, though once in place each panel 40 may be permanently attached at their lower edges to the adjoining panels by the overlapping tabs 44 or other the permanent attachment means as noted above. Each panel 40 may be attached to its housing unit 24 by having bolts 52 (rivets or other attachment means) pass through a grommet 49 in the lower edge 50 of the panel 40 and through an opening 34 in the horizontal flange 30 on the windward side of the housing 24. This mode of attachment of the panel 40 to the underside of the flange 30 may be water impermeable and may be seen in FIG. 4. Each panel 40 may be attached to the adjoining one by overlapping the hook and loop fastener 43 along each vertical edge after which the low tabs 44 on each side of the panel 40 may be secured in place using a waterproof adhesive to form a permanent attachment. The hook and loop 43 fasteners may be left connected or they may be separated for ease of storage. The panels 40 may be folded horizontally into the housing 24 where they may remain until they are needed. The permanent attachments along the bottom edges of the adjoining panels 40, the low tabs 44 or other joinder means, may facilitate the assembly of the membrane wall 25 when a storm approaches.

The other essential component stored in the housing 24 may be the foldable supports 26 which may form the backbone or skeleton for the membrane wall 25. Each support 26 may be in the form of a right triangle with two unequal sides, the vertices of the two acute angles being truncated. When set for use, the plane of each support 26 may be perpendicular to the line of the installation. The horizontal edge or base 55 (the short side) of the support 26 may rest at ground level substantially leeward of the housing 24 and the vertical edge 56 (the long side) may face windward with the hypotenuse 57 facing leeward. The supports 26 may be constructed in two vertical segments, the width of each segment being equal to one half the length of the base 55. As previously noted, this measurement may be the most critical in the preparation of the flood barrier assembly 20. The folded supports 26 must lie on their side edges, as seen in FIG. 1, and be completely contained within the housing 24 thereby determining the depth of the housing 24 and the depth of the trench 21, as well as the dimensions of the ballast 23. Thus, the anticipated height of the flood waters must be very carefully assessed before any construction or manufacture may be begun and so the dimensions of all components of the flood barrier assembly 20 may be accurate and specific to each installation.

The supports 26 may be constructed in two segments, as noted above, as if the base of the triangular support was divided in half by a vertical line. The two segments may be joined by hinges 58 set along the adjacent vertical edges. There may also be a slide bolt 59 across the two segments along the base 55 to lock the support 26 in the open orientation when the assembly 20 may be set for a storm, as may be seen in FIG. 5.

An important consideration regarding the flood barrier assembly 20 of the instant invention may be the proper attachments of the essential components so that they may remain secure and intact during the most severe of storms. This may only be accomplished if each component is independently secured against the forces expected to effect that component. If the supports 26 are not securely anchored they may not fulfill their function and the system may fail. Therefore, each support 26 must be anchored at both the windward and the leeward ends of the base 55 in order that the support 26 remain erect and not be uprooted or forced downward and backward due to the forces of wind and rising water.

At the time of the original installation of the flood barrier assembly 20, heavy equipment may be used to dig the trench 21 and prepare the ballast 23. At this same time provision may be made for anchors to be installed to secure the leeward ends of the supports 26. These anchors may take various forms. One such anchor may be in the form of additional concrete in-ground footings 60. Since there must be one footing 60 for each support 26, the number of supports 26 for each housing unit 24 and therefrom the distance between supports 26 may be another calculation that must be made when the original assessment is prepared before construction begins. The footings 60 may be disposed leeward, below ground level, and adjacent to the trench 21 following the line of the installation. Each concrete footing 60 may have an anchor bolt with a loop 61 which may extend above the concrete surface but lie below ground level.

Another anchor for the leeward end of the supports 26 may be in the form of a strut 62 embedded within the concrete ballast 23. The strut 62 may be inserted at the time of the original installation and set at an angle extending upward from the ballast 23 and attached to a metal cup-like container 64 set into the ground where the leeward end of the support 26 may be disposed during deployment. The container 64 may also be further secured within a concrete footing 60 as may be determined by the original estimates of flood height and forces expected. There may be a post with a loop 61 at the top permanently affixed to the bottom of the container 64 and extending upward but not above the walls of the container 64.

There may be a second strut 65 disposed horizontally just below ground level, leeward of the housing 24 and extending from the upper end of the leeward wall of the housing 24 to the container 64. This strut 65 may be attached to the exterior of the housing 24 and to the container 64 by welding or other means known in the art. The leeward wall of the housing 24 and the two struts 62, 65 with the container 64 may form a strong and secure triangular anchor for the supports 26. The struts may be angle iron, steel, aluminum or other strong, durable and water resistant material. The struts and container may be placed and secured at the time of the original installation when all below ground structures may be set in place and back filled. The container 64 may be fitted with a cover that can be snapped off easily when the assembly may be deployed.

To assemble the barrier wall, the supports 26 may be removed from the housing 24, unfolded, the slide bolts 59 set, and the supports 26 placed in the vertical orientation adjacent to the corresponding container 64, the leeward anchor. Attachment means in place on each support may then cooperate with the loop 61 within the container 64 to complete the leeward ground anchor. Other forms of below-ground anchor may also be utilized.

Any means selected to attach the supports 26 to the loops 61 may be affixed to the support 26 during its manufacture. One attachment means that works well and may be used at any point of attachment of the supports 26 may be a manual latch clamp 63 such as the one manufactured by DESTACO and designated 'the pull action latch clamp 351'. This latch clamp 63 is available in several sizes and may enable a quick and easy assembly and tight closure for secure connections. See FIG. 5. The latch clamp 63 may be affixed proximate to the leeward end of support 26 and may be oriented downward so that the clamp may cooperate with the loop 61.

For proper balance and to insure that the supports 26 remain stable, an anchor must also be provided at the windward end of the base 55 of each support 26. This may be accomplished by having an anchor added to the interior of the housing 24. As previously noted, a series of openings 31 may be disposed along the center line of the bottom 29 of the housing 24 and some of these openings 31 enable the housing to be attached to the ballast 23. One form of anchor for the supports 26 may be in the form of a series of posts 66 set into the other openings 31. The placement of the posts 66 must align with the placement of the containers 64 so that both ends of the base 55 of each support 26 may be properly anchored and aligned. Each post 66 may have a loop 67 at its upper end to cooperate with a latch clamp 63 affixed near the bottom of the vertical edge 56 of the support 26. The posts 66 may also have a collar 68 at the lower end with a threaded extension 69 below the collar 68. See FIGS. 5, 6, and 7. These posts 66 may be installed into the housing 24 at the time of manufacture or at the installation site before the housing 24 is set in place. A post 66 may be placed into an opening 31 in the bottom 29 of the housing 24 so that the threaded end protrudes downward through the opening 31. A nut 70 may be fastened under the housing and tightened to hold each post 66 securely in place. Washers may be used with each nut 70. Alternatively, the posts 66 may be permanently attached along the center line of the bottom surface 29 of the housing 24 during manufacture. This may be accomplished by welding or any other suitable means known in the art.

Figure 5:
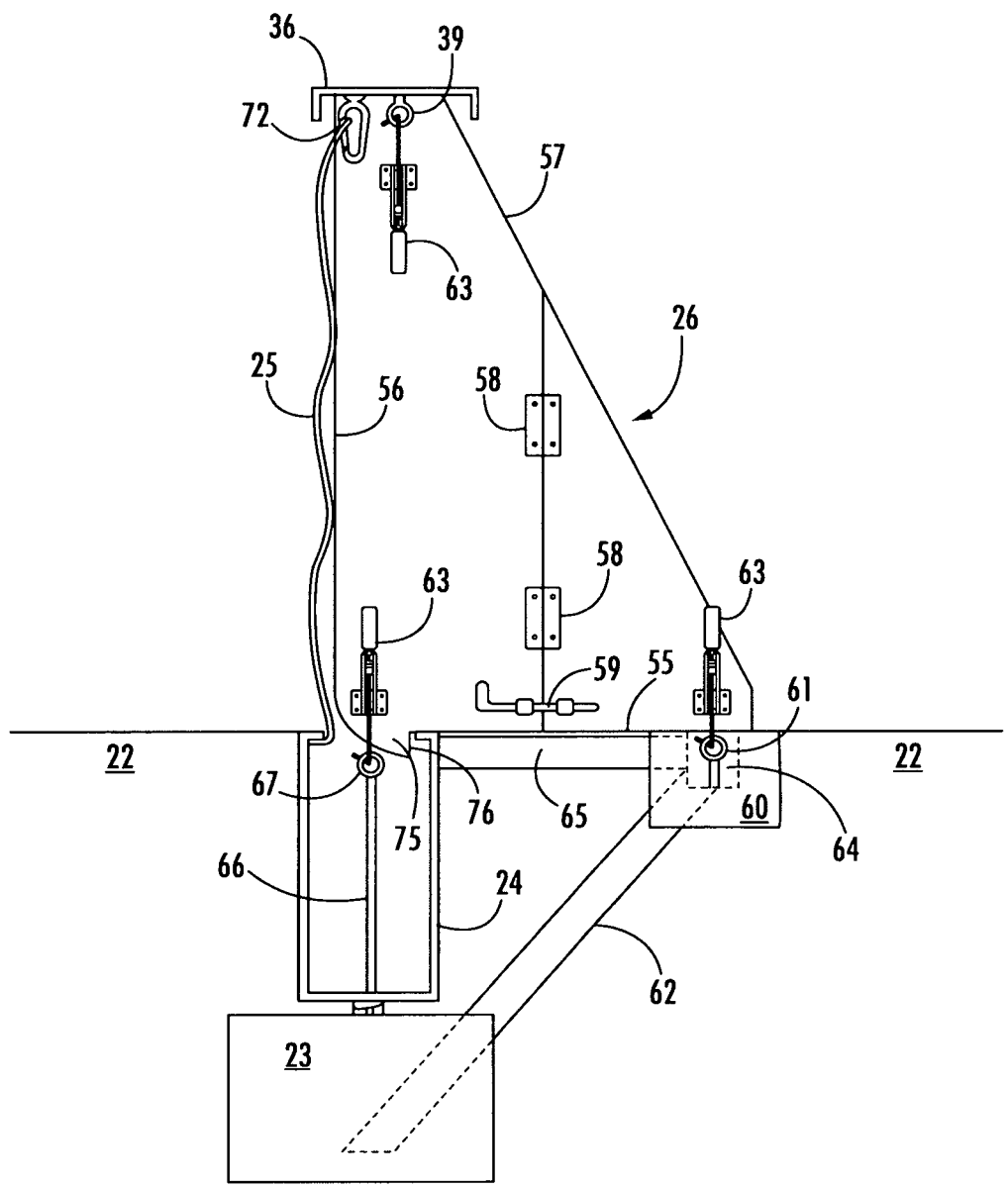
FIG. 5 is a side plan view of a foldable support, housing, ballast, cover, fabric panel, and attachments.
Figure 6:
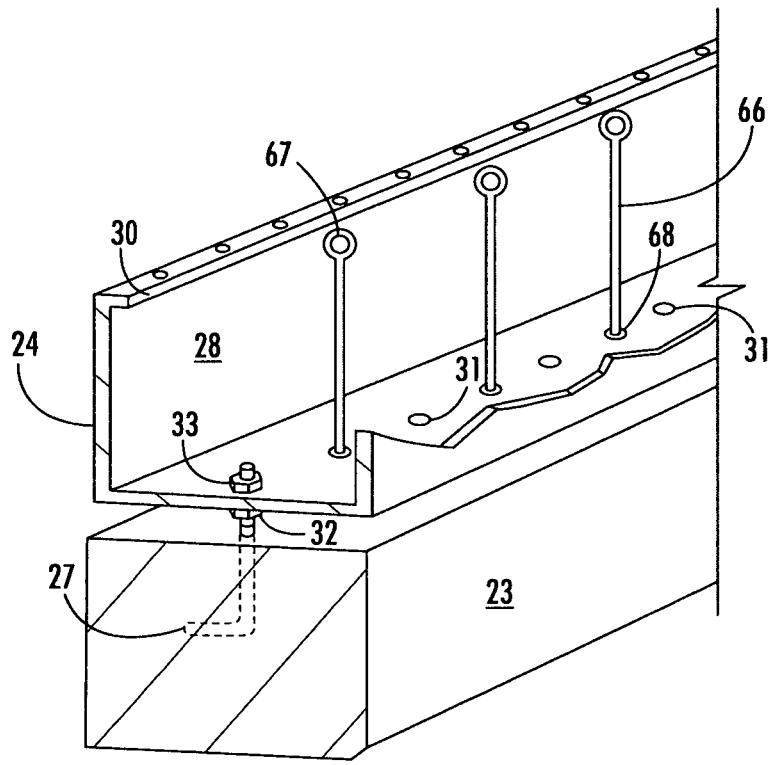
FIG. 6 is the side perspective view of FIG. 2 with the addition of the anchor posts.
Figure 7:
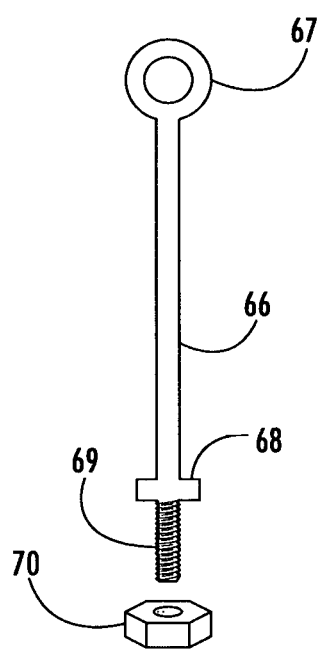
FIG. 7 is a front view of an anchor post with attaching nut.
Figure 8:
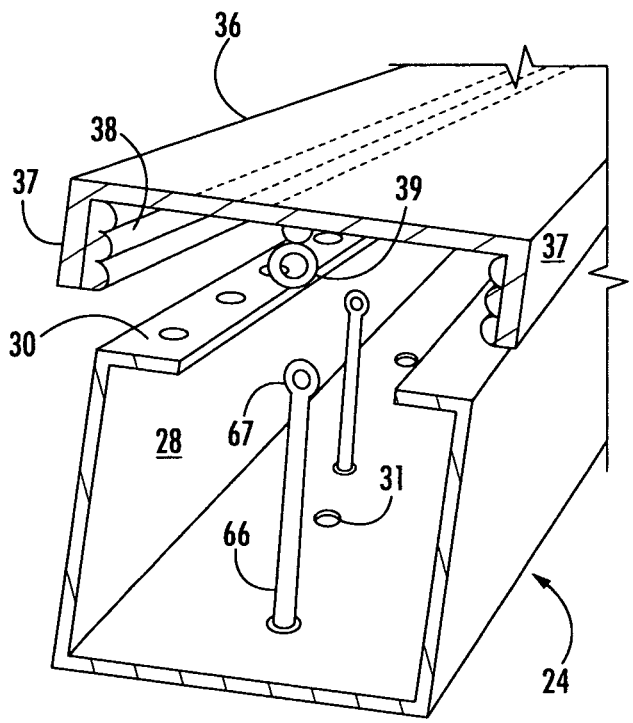
FIG. 8 is a perspective view of the a segment of the housing with the anchor posts and cover with attaching ring.

The posts 66 situated along the center line of the bottom 29 of the housing 24 may also serve as a divider within the housing, as may be seen in FIGS. 5, 6 and 8, so that the folded fabric panels 40 may be disposed on the windward side of the line of posts 66 and the folded supports 26 may be disposed on the leeward side for a neat compartmentalization for these components when the assembly 20 is not in use.

The latch clamp 63 disposed along the vertical edge 56 of the support 26 may be oriented so that the hook portion of the clamp 63 may cooperate with the loop 67 at the top of the post 66 when the support 26 is set in place. This may be seen in FIG. 5. The location of the posts 66 may also expedite the assembly of the barrier wall since their placement may remove any need to determine where the supports are to be set. All measurements may be determined before any construction or manufacture occurs, which may include the placement and spacing of the containers 64 and of the posts 66. All pre-set spacing and positioning may also insure that no special skills or tools may be needed to assemble the flood barrier quickly and efficiently.

The windward and leeward anchors for each support 26 may insure against the support being upended during severe storm conditions. However, the strongest forces against the barrier wall may be against the lower portion of the vertical edge 56 of the support 26. Should these forces become strong enough, the support 26 could be forced backward (leeward) even with the anchors provided. To insure that there can be no backward movement of the supports 26 they may be constructed with an extension 75 projecting downward below the line of the base 55 along the vertical edge 56. The extension 75 may extend into the housing and form a vertical ledge 76 which may be disposed against the flange 30 on the leeward wall when the support 26 is properly set for deployment. This vertical ledge 76 may act as a stop means to prevent any backward movement of the support during severe storm conditions. See FIG. 5

In the description of the supports 26 it was pointed out that the vertices of the two acute angles may be truncated. The angle at the leeward end of the base 55 may be truncated to shorten the overall length of the base 55 so that folding the supports 26 in half for storage within the housing 24 may require the least possible depth. The vertex at the upper end of the vertical edge 56 may be truncated for a different reason. When all of the supports 26 are properly set and anchored in place, the truncated upper ends provide flat upper surfaces at the top of the supports 26. All of the supports taken together form a horizontal "plane" on which the cover 36 may be set during the assembly of the barrier wall.

Figure 10:
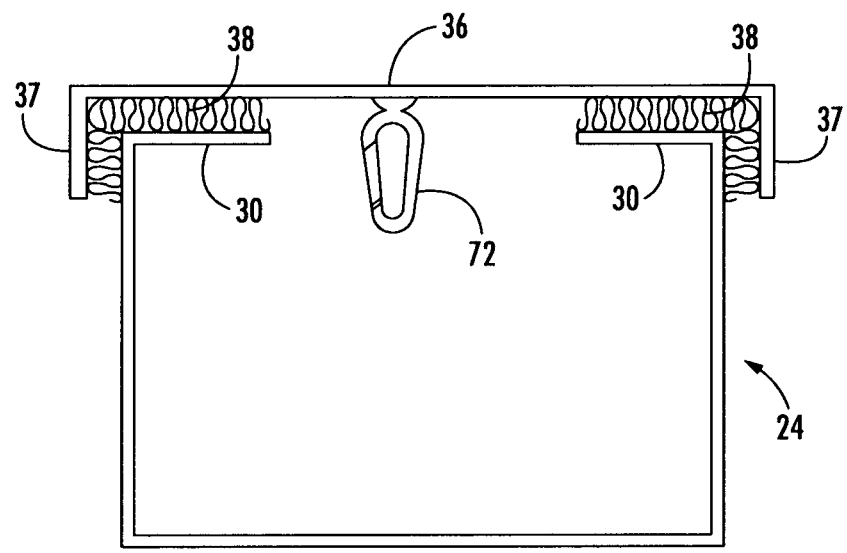
FIG. 10 is a is a side plan view of the housing and cover with the clip for attaching the fabric panel (not shown)

The cover 36 for the housing 24 may protect the contents of the housing when the system is not in use and may also be an essential element in the assembly and sustainability of the barrier wall when deployed. The cover 36 may be flat, slightly wider than the width of the housing 24, and the full length of the housing, including any overlap at the end for a friction fit between housing units. There may be a side overhang or downward facing flange 37 along the length of each side of the cover 36 so that the cover 36 fits easily over the housing 24 and completely encloses and protects the interior. To insure that no moisture or particulates get into the housing 24 during periods when the system is not needed, there may be a quantity of insulation 38 along both sides of the cover 37. See FIGS. 8 and 10. The insulation 38 may be a foam, a seal, or other form of insulation known in the art. Once the cover 37 is in place, the interior of the housing 24 may be completely sealed against the all weather conditions.

Figure 9:
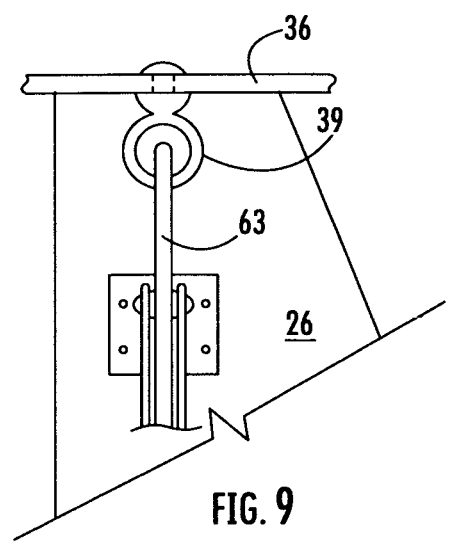
FIG. 9 is a side plan view of a portion of a support showing the attachment of a clamp to the attaching ring.
Figure 11:
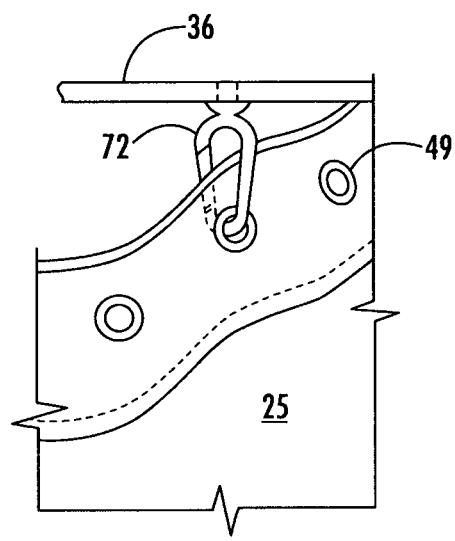
FIG. 11 is a partial perspective view of a portion a fabric panel showing the attachment to the cover with the clip.

To function as an essential element in the assembly and sustainability of the barrier wall there may be two additional structural elements which may be permanently attached to the underside of the cover 36. One element may be in the form of a line of rings 39 spaced apart at discrete intervals and oriented in a straight line. The number and spacing of the rings 39 may conform to the number and spacing of the posts 66 situated along the bottom 29 of the housing 24 which form the attachment means for the windward ends of the support base 55. The other element may be in the form of a line of clips 72 also spaced at discrete intervals and set in a straight line along the underside of the cover 36. The clips 72 may be configured much like a carabiner with a spring loaded gate with which to quickly and reversibly attach the fabric wall panel 40 to the underside of the cover 36. The clips 72 may be more numerous and spaced closer together than the rings 39 but positioned so as not to interfere with the placement of the supports 26. The clips 72 may function to maintain the fabric panels 40 upright and the spacing may insure minimal draping without stretching the fabric too taut. The rings 39 may be seen in FIGS. 8 and 9, and the clips 72 may be seen in FIGS. 10 and 11. Both the rings 39 and the clips 72 may be securely affixed to the cover by any means known in the art. Other means known in the art may also be used for these two attachment elements.

As previously described, when the fabric panels 40 are installed into the housings 24 the lower edge 50 of each panel may be permanently affixed to the underside of the flange 30 along the upper edge of the vertical side wall 28 on the windward side of the housing 24 by means of the grommets 49 along the lower edge 50 of the fabric panels 40. At that time the upper edge 51 of the fabric panel 40 may be affixed to the underside of the cover 36 by connecting the grommets 49 along the upper edge 51 to the clips 72 by simple inward pressure on the spring loaded gate insuring a secure attachment. (FIG. 11) However, the clips 72 may make this attachment quick and easy since no tools of any kind may be necessary. Therefore, the fabric panels 40 may be folded and stored within the housing and attached to the cover when needed.

Figure 12:
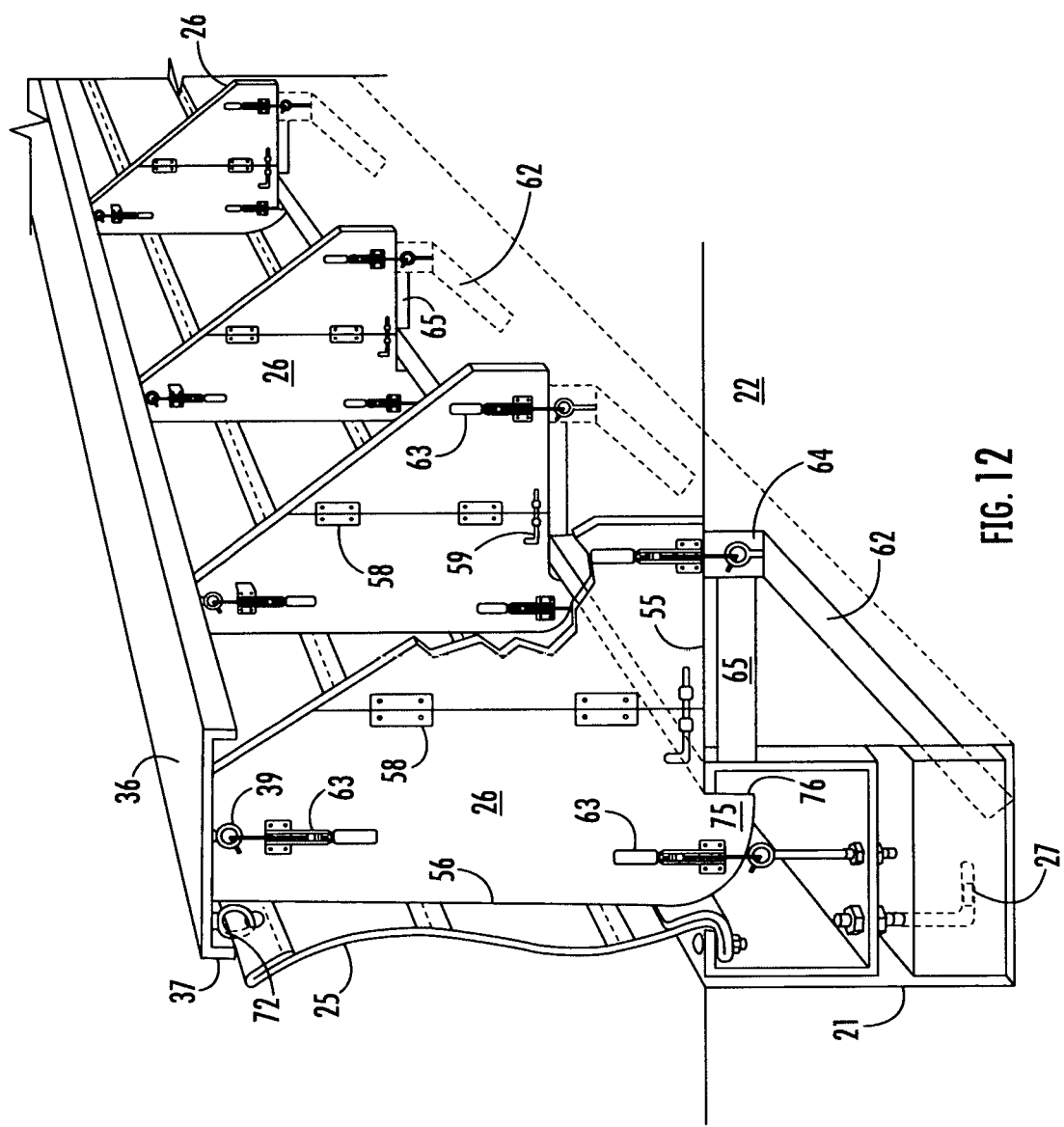
FIG. 12 is a perspective view of a segment of the barrier wall from the leeward side fully deployed and ready for a flood.

In the deployment of the flood barrier assembly 20 the components of one housing 24 unit may be set up at a time and then the adjacent one prepared. The cover 36 of each unit may be lifted and placed on the ground adjacent to the trench 21. The supports may be removed, set in place, and the two lower latch clamps 63 fastened. The cover 36 may then be placed on top of the 'plane' created by the line of supports 26. A third latch clamp 63 on each support 26 may be vertically situated near the center of the flat upper end of the support 26 and oriented to cooperate with one of the rings 39 on the underside of the cover 36, as may be seen in FIGS. 5, 9 and 12. This attachment may provide a downward force on the cover 26 and along with the windward and leeward anchors along the base 55 may provide a three point anchoring system for the supports 26 to insure that the supports 26 remain in the vertical orientation throughout any storm surges.

As noted in the above descriptions, there may be three clamps 63 affixed to each support. The three clamps 63 may be disposed on the same side of each support 26 so that when the supports may be folded for storage the clamps rest on the inside of the fold. This may enable the supports to be placed one against the other within the housing. To make this possible, offset hinges 58 may be used to attach the two segments of each support together.

Once the cover 36 has been secured on top of the supports 26, the fabric panel 40 may be lifted upward out of the housing 24 and fastened to underside of the cover 36 by having the grommets 49 along the upper edge 51 of the fabric panel 40 cooperate with the clips 72 described above as seen in FIG. 11. The permanent attachment of the lower edge 50 of the fabric panel 40 to the housing 24 and the secure attachment of the upper edge 51 to the cover 36 may provide a flood barrier wall to withstand the most severe flood conditions.

The cover 36 may function as an anchor for the upper edges 51 of the membrane wall 25 and may provide a continuous and lateral continuity between the vertically oriented supports 26. Prior art has taught that the membrane wall be tethered to whatever support posts are used with no lateral connection. The secure attachment of the membrane wall 25 to the well supported and anchored cover 36 extending throughout the full line of protection may provide that lateral support.

When a storm approaches, the assembly of the flood barrier wall 20 may be accomplished by two workers with no special skills. However, this can be done by one person, but it may take somewhat longer. The best way to assemble the barrier wall may be to systematically work with one housing unit 24 at a time, then move to the next adjoining housing unit 24. Two workers may be able to fully deploy each 10 feet of wall (3.05 m) in 15 minutes. The first step may be the removal of the cover 36, by lifting it from the housing and setting it down on the ground on the windward side of the trench 21. The next step may be to remove all of the supports 26 from the housing 24 and placing them upright as indicated by the location of each anchor post 65 within the housing 24 and the corresponding container 64 or other attachment means on the leeward side of the trench 21. The latch clamp 63 on the lower end of the vertical edge 56 of the support 26 may be attached to the loop 67 of the anchor post 66 and the latch clamp 63 near the leeward end of the base 55 may be attached to the loop 61 within the container 64. These steps may enable the supports 26 to remain upright.

The cover 36 may then be lifted and placed on top of the row of upright supports 26 so that the underside of the cover 36 may be in contact with the flat tops 54 of the supports 26. The latch clamp 63 near the upper end of the support 26 may be attached to the corresponding ring 39 on the underside of the cover 36, then the fabric panel 40 may be raised and attached to the cover 36 using the clips 72. This may be seen in FIG. 12. These same steps may now be repeated for the next adjoining housing unit 24. When the components of the next unit have been properly set, the adjoining edges of the fabric panels 40 may be attached by pressing the two overlapping edges of the fabric segments 40 together so that the hook and loop fasteners 43 may cooperate. Thereafter, the reinforcing straps 48 or clamps may be joined for added protection against lateral shear. The adjacent fabric panels 40 may be joined as the work progresses until the entire membrane wall 25 has been completed and the assembly ready for whatever weather may be in store. When all of the panels 40 have been properly joined, the membrane wall 25 may be completely water impermeable and able to withstand considerable forces from any direction.

The present invention may function well from urban settings to very rural areas, though urban settings may provide more challenges in preparation of the initial installation. Urban installations may also require the use of locking mechanisms built into the covers to insure the security and integrity of the housing and its contents. Such areas may also require surface adjustments or additions to the exterior of the cover to eliminate potential slippery surfaces and to better insure that the cover resemble its surroundings. The below ground containers 64 may be protected by special easily removed caps so they do not present a ground depression and also to minimize vandalism. Once the installation has been completed, the ease of deployment and the protection offered to any enclosed area may be the same regardless of the setting in which the assembly has been installed.

When the present assembly is used in urban settings, some units may be left unassembled until the last minute to allow for traffic or pedestrian ingress and/or egress to the enclosed area. The ease of assembly and joinder may also make the last minute finalization a simple matter. Also the fact that no tools are needed and everything is contained in each module may add to the facility of leaving spaces until the last possible moment.

It may be essential to the sustainability of the present invention that the fabric chosen for the membrane wall 25 does not yield to any puncture or cut which may result in an expansion of the fissure in any direction. The reinforcing strips 41 and 42 may also function to accomplish this in addition to providing extra strength overall. The use of multiple individual panels 40 may make replacement of any panels damaged too severely during a storm to be accomplished with a minimum of inconvenience.

Many flood barriers that have come in contact with contaminated materials may no longer be reused. The materials of the present invention may enable any needed cleanup to proceed quickly and effectively. The windward side of the flood barrier wall may be smooth so as not to attract debris and other materials and may be power washed or sprayed with any disinfectants as needed. The leeward side would not have been subjected to flood waters or debris and may be easily cleaned. Once properly cleaned and dried the flood barrier wall may be disassembled and returned to the housing modules to await the next storm.

While one embodiment of the present invention has been illustrated and described in detail, it is to be understood that this invention is not limited thereto and may be otherwise practiced within the scope of the following claims.

I claim:

1. A permanent below ground flood barrier installation to protect a specified area when flood waters are imminent, said installation comprising:
   a trench surrounding the area to be protected, said trench having a bottom surface;
   a concrete ballast disposed along the bottom surface of the full length of said trench;
   a housing the length of said trench disposed above the concrete ballast and anchored thereto, said housing having an interior;
   a flexible water impermeable fabric wall foldably contained within the housing and extendable upward to protect the area when flood waters are imminent;
   a series of supports contained within the housing, said supports to be set at ground level to maintain the fabric wall when extended upward wherein said supports are substantially in the shape of a right triangle with a longer leg being windwardly and vertically oriented when the supports are set at ground level, a shorter leg being the base of the support in contact with the ground and the hypotenuse oriented leewardly, said supports being composed of two segments which together form the right triangle with the bases of the two segments being coextensive, of equal length, and together forming the base, said segments being hingedly connected together such that when folded and placed longitudinally within said housing they do not extended beyond an interior of said housing; and
   a removable cover to protect the interior of the housing and its contents when not in use against flood waters and to form an integral part of the flood barrier.

2. A permanent below ground flood barrier installation to protect a specified area when flood waters are imminent, said installation comprising:
   a trench surrounding the area to be protected, said trench having a bottom surface;
   a concrete ballast disposed along the bottom surface of the full length of said trench;
   a housing the length of said trench disposed above the concrete ballast and anchored thereto, said housing having an interior;
   means for anchoring the housing to the ballast such that the housing is not contiguous therewith;
   a flexible water impermeable fabric wall foldably contained within the housing and extendable upward to protect the area when flood waters are imminent, said fabric wall having an upper edge and a lower edge;
   a series of supports having a horizontal upper edge contained within the housing, said supports to be set at ground level to maintain said fabric wall when extended upward;
   a removable cover to protect the interior of the housing and its contents when not in use against flood waters and to form an integral part of the flood barrier;
   means for affixing the lower edge of said fabric wall to the housing such that the flood waters cannot enter the housing or pass beyond the fabric wall; and
   means for affixing the upper edge of said fabric wall to the cover such that the cover can be set on the horizontal upper edges of the supports to sustain the upward extended fabric wall;
   whereby the fabric wall is secured at the lower edge to the housing and the upper edge to the supported cover to form the completed flood barrier and the flood waters cannot pass therebeyond.

3. A permanent below ground flood barrier installation for rapid deployment, requiring no special skills or implements, for the protection of a specified area when flood waters are imminent, said installation comprising: a trench surrounding the area to be protected, said trench having a bottom surface; a concrete ballast disposed along the bottom surface of the full length of said trench; a housing the length of said trench disposed above the concrete ballast and anchored thereto, said housing having an interior including two sidewalls, a windward wall and a leeward wall, with an inward facing flange along the full length of an upper edge of both sidewalls, a series of spaced apart openings along the full length of the inward facing flange on the upper edge of the windward wall, and said housing including two sidewalls, a windward wall and a leeward wall, with an inward facing flange along the full length of an upper edge of both sidewalls, a series of spaced apart openings along the full length of the inward facing flange on the upper edge of the windward wall, and said housing.

4. The permanent below ground flood barrier installation as described in claim 3 wherein said housing further comprises a substantially flat bottom surface and said two sidewalls are substantially vertical.

5. The permanent below ground flood barrier installation as described in claim 4 further comprising a series of spaced apart openings centered along the flat bottom surface of the housing.

6. The permanent below ground flood barrier installation as described in claim 5 further comprising a series of anchor bolts imbedded in the concrete ballast and having threaded extensions vertically protruding above the concrete ballast, said anchor bolts being spaced apart such that the threaded extensions can communicate with the openings centered along the flat bottom surface of the housing.

7. The permanent below ground flood barrier installation as described in claim 6 further comprising a series of nuts dimensioned to cooperate with said threaded extensions of the anchor bolts.

8. The permanent below ground flood barrier installation as described in claim 7 wherein the means for anchoring the housing to the concrete includes lowering said housing onto the ballast such that the threaded extensions pass through the openings centered along the flat bottom surface, threading one of the nuts onto each extension to contact the flat bottom surface, and tightening said nuts whereby the housing is securely anchored.

9. The permanent below ground flood barrier installation as described in claim 6 wherein the means for anchoring the housing to the ballast comprises a series of nuts dimensioned to cooperate with the treaded extensions of the anchor bolts, there being two nuts, a first nut and a second nut, for each anchor bolt.

10. The permanent below ground flood barrier installation as described in claim 9 wherein the first nut is threaded onto each extension and the height of the first nuts are adjusted to provide a series of attachment points that are substantially in linear alignment.

11. The permanent below ground flood barrier installation as described in claim 10 wherein the attachment points are coordinated to provide proper alignment for the modules and thereby for the housing along its full length.

12. The permanent below ground flood barrier installation as described in claim 10 wherein the the housing is anchored to the ballast by lowering said housing onto the ballast such that the remaining threaded extensions above the first nuts pass into the housing through the openings centered along the bottom surface and threading the second nuts onto the extensions to contact the flat bottom surface thereby permanently anchoring the housing to the ballast such that the housing is not contiguous with the ballast and the adjustment of the first nuts maintains said housing modules in substantially linear alignment along the full length of the housing.

13. The permanent below ground flood barrier installation as described in claim 3 wherein the the lower edge of the fabric wall further comprises a series of grommets disposed at substantially the same spacing as the openings in the inward facing flange on the windward wall so as to communicate therewith and an attaching means to cooperate with the grommets and the openings thereby affixing the lower edge of the fabric wall to the housing.

14. The permanent below ground flood barrier installation as described in claim 3 wherein the supports are substantially in the shape of a right triangle with a longer leg being windwardly and vertically oriented when the supports are set at ground level, a shorter leg being the base of the support in contact with the ground and the hypotenuse oriented leewardly.

15. The permanent below ground flood barrier installation as described in claim 14 wherein the two vertices of the right triangle are truncated.

16. The permanent below ground flood barrier installation as described in claim 14 wherein the supports are comprised of two segments which together form the right triangle with the bases of the two segments being coextensive, of equal length, and together form the base of the support.

17. The permanent below ground flood barrier installation as described in claim 16 wherein the two segments of the supports are hingedly connected together such that the supports may be folded and placed longitudinally within said housing for storage and do not extend beyond the interior of said housing.

18. The permanent below ground flood barrier installation as described in claim 14 further comprising means for sustaining the supports in vertical orientation to maintain said fabric wall when extended upward.

19. The permanent below ground flood barrier installation as described in claim 3 wherein said supports further comprise a base with a windward end and a leeward end and means for anchoring said supports at both the windward end and the leeward end such that said supports maintain the fabric wall when extended upward and are not caused to be upended or forced downward by oncoming flood waters or heavy winds.

20. The permanent below ground flood barrier installation as described in claim 19 wherein the means for anchoring said supports at the windward end comprises anchor posts permanently affixed along a substantially flat bottom surface of said housing and means for reversibly attaching the windward end of said base to the anchor post.

21. The permanent below ground flood barrier installation as described in claim 19 wherein the means for anchoring said supports at the leeward end comprises a series of permanent in-ground containers having an interior in which are permanently disposed attachment loops, said containers being situated along the leeward side of said trench and adjacent thereto, and means for reversibly attaching the leeward end to the attachment loop.

22. The permanent below ground flood barrier installation as described in claim 21 wherein the means for anchoring said supports at the leeward end further comprises a first strut attached to and extending at an angle from the ballast to the container and affixed thereto and a second strut attached to the housing and extending horizontally below ground level to the container and affixed thereto.

23. The permanent below ground flood barrier installation as described in claim 3 wherein the means for affixing the upper edge of the fabric wall to the cover comprises a series of spaced apart grommets disposed along the upper edge of said fabric wall and a series of clips projecting downwardly from an underside of the cover along its full length such that the grommets cooperate with the clips when the fabric wall is extended upward.

24. The permanent below ground flood barrier installation as described in claim 3 further comprising means for anchoring an underside of the cover to the supports such that the cover is set on the horizontal upper edges of the supports when the supports are set at ground level, said means comprising a series of loops permanently affixed to the underside of said cover along its full length and reversible attaching means disposed on said supports to cooperate with said loops such that the cover is maintained on the horizontal upper edges of said supports throughout flood conditions.

25. The permanent below ground flood barrier installation as described in claim 3 wherein each fabric wall panel further comprises two opposing vertical edges, an obverse side and a reverse side, one vertical edge having reversible coupling means on the obverse side and the opposing vertical edge having reversible coupling means on the reverse side whereby adjacent panels are coupled together to provide the water impermeable fabric wall when flood waters are imminent and uncoupled for storage.

26. The permanent below ground flood barrier installation as described in claim 3 further comprising a series of reinforcing strips permanently affixed to each fabric wall panel to prevent damage from debris brought in contact therewith from flood waters.

27. The permanent below ground flood barrier installation as described in claim 3 further comprising connecting means disposed at the lower edges of the fabric wall panels for permanently connecting adjacent panels together at said lower edges thereby making assembly of the water impermeable fabric wall quick and efficient when flood waters are imminent.

28. The permanent below ground flood barrier installation as described in claim 3 wherein the supports are substantially in the shape of a right triangle with a longer leg being vertically oriented, a shorter leg being the base of the support and in contact with the ground, and anchoring means at each of three apices of said triangle for anchoring said supports when maintaining the upwardly extended fabric wall during flooding.

29. The permanent below ground flood barrier installation as described in claim 3 wherein the supports are planer in configuration and aligned perpendicular to the line of the trench when set at ground level to maintain said fabric wall when extended upward.

30. The permanent below ground flood barrier installation as described in claim 3 wherein the modules are permanently interconnected and said connections are water impermeable.

31. The permanent below ground flood barrier installation as described in claim 3 wherein the supports are substantially in the shape of a right triangle with a longer leg being windwardly and vertically oriented with a windward edge and a shorter leg being the base of the support in contact with the ground when the supports are set at ground level and further comprising a downward extension of said longer leg disposed proximate to said windward edge and a leeward wall within the housing such that the extension lies within the interior of said housing and adjacent to said leeward wall thereby forming a stop means to prevent any leeward movement of said support when subjected to the flood waters.

* * * * *

UNITED STATES PATENT AND TRADEMARK OFFICE
CERTIFICATE OF CORRECTION

| | |
|---|---|
| PATENT NO. | : 11,255,100 B1 |
| APPLICATION NO. | : 17/300558 |
| DATED | : February 22, 2022 |
| INVENTOR(S) | : Christopher T. Hughes |

It is certified that error appears in the above-identified patent and that said Letters Patent is hereby corrected as shown below:

In the Claims

Replace: Column 18, Lines 9 - 27 with:
3. A permanent below ground flood barrier installation for rapid deployment, requiring no special skills or implements, for the protection of a specified area when flood waters are imminent, said installation comprising:
    a trench surrounding the area to be protected, said trench having a bottom surface;
    a concrete ballast disposed along the bottom surface of the full length of said trench;
    a housing the length of said trench disposed above the concrete ballast and anchored thereto, said housing having an interior including two sidewalls, a windward wall and a leeward wall, with an inward facing flange along the full length of an upper edge of both sidewalls, a series of spaced apart openings along the full length of the inward facing flange on the upper edge of the windward wall, and said housing formed of a series of interconnected modules;
    means for anchoring said housing to the ballast;
    a flexible water impermeable fabric wall foldably contained within the housing and extendable upward to protect the area when flood waters are imminent, said fabric wall formed from a series of reversibly connected panels and having an upper edge and a lower edge, each panel being contained within one module;
    a series of supports having a horizontal upper edge and contained within the housing, said supports to be set at ground level to maintain said fabric wall when extended upward;
    a removable cover to protect the interior of the housing and its contents when not in use against flood waters and to form an integral part of the flood barrier, said cover comprising a series of interconnected segments, one segment for each module;
    means for affixing the lower edge of said fabric wall to the housing such that the flood waters cannot enter the housing or pass beyond the fabric wall; and
    means for affixing the upper edge of said fabric wall to the cover such that the cover can be set on the horizontal upper edges of the supports to sustain the upward extended fabric wall;
whereby the fabric wall is secured at the lower edge to the housing and the upper edge to the supported cover to form the completed flood barrier and the flood waters cannot pass therebeyond.

Signed and Sealed this
Twenty-fifth Day of October, 2022

Katherine Kelly Vidal
*Director of the United States Patent and Trademark Office*